UNITED STATES PATENT OFFICE.

NORA L. HAGEMAN, OF READING, PENNSYLVANIA.

GLOSS COMPOUND FOR STARCH.

SPECIFICATION forming part of Letters Patent No. 596,265, dated December 28, 1897.

Application filed April 14, 1897. Serial No. 632,120. (No specimens.)

*To all whom it may concern:*

Be it known that I, NORA L. HAGEMAN, a citizen of the United States, residing at Reading, county of Berks, State of Pennsylvania, have invented a certain Improved Gloss Compound for Starch, of which the following is a specification.

My invention relates to an improved compound adapted for use in connection with starch for the purpose of giving to laundered linen a hard glossy surface.

My object is to enable the desired glossy effect to be produced in a very simple and satisfactory manner, so that it may be readily secured in ordinary family work.

My improved compound is most satisfactorily manufactured by combining the several ingredients comprising it in the manner and proportions, which I will now particularly describe.

I take eight parts, by weight, of white glue, eight parts of borax, (sodii boras,) and eight parts of gum-arabic (acacia) and dissolve these several ingredients in hot water, of which a sufficient amount is used to effect their dissolution. I then add to the mixture eight parts of alcohol and one part of eau-de-cologne. After being thoroughly mixed and subsequently cooled the compound, which is of the consistency of jelly, is ready to be put up in suitable packages for family use.

In making use of the compound about one teaspoonful should be dissolved in about a quart of hot water, to which is also added about a tablespoonful of ordinary starch, as usual. The operation of applying the starch and gloss compound thus produced to the linen is similar to that commonly used, and the subsequent ironing of the starched linen in the ordinary way produces the hard and glossy surface desired.

What I claim is—

A gloss compound made up of glue, borax, gum-arabic, alcohol, eau-de-cologne and water, in substantially the manner and proportions described.

In testimony whereof I affix my signature in presence of two witnesses.

NORA L. HAGEMAN.

Witnesses:
 W. G. STEWART,
 ADAM L. OTTERBEIN.